(12) United States Patent
Kolloff et al.

(10) Patent No.: US 6,717,302 B2
(45) Date of Patent: Apr. 6, 2004

(54) MOTOR FOR USE WITH A SENSOR

(75) Inventors: Bruce Kolloff, Gulfport, MI (US); Mathew Bagneski, Kenosha, WI (US)

(73) Assignee: Danaher Controls Corporation, Gurnee, IL (US)

( * ) Notice: Subject to any disclaimer, the term of this patent is extended or adjusted under 35 U.S.C. 154(b) by 0 days.

(21) Appl. No.: 10/210,184

(22) Filed: Jul. 31, 2002

(65) Prior Publication Data

US 2004/0021378 A1 Feb. 5, 2004

(51) Int. Cl.⁷ ............................................. H02K 11/00
(52) U.S. Cl. ........................ 310/71; 310/68 B; 310/89
(58) Field of Search ................................ 310/71, 68 B, 310/68 R, 89, 91

(56) References Cited

U.S. PATENT DOCUMENTS

| | | | | |
|---|---|---|---|---|
| 3,809,935 | A | * | 5/1974 | Kristen et al. ............ 310/68 R |
| 4,642,496 | A | * | 2/1987 | Kerviel et al. ............ 310/68 B |
| 4,644,157 | A | | 2/1987 | Ozawa et al. |
| 4,773,829 | A | * | 9/1988 | Vettori ....................... 417/366 |
| 4,988,905 | A | * | 1/1991 | Tolmie, Jr. ................ 310/68 B |
| 5,086,221 | A | | 2/1992 | Ishihara et al. |
| 5,103,225 | A | | 4/1992 | Dolan et al. |
| 5,293,125 | A | * | 3/1994 | Griffen et al. .............. 324/173 |
| 5,763,970 | A | * | 6/1998 | Dunning et al. .......... 310/68 B |
| 6,078,273 | A | | 6/2000 | Hutchins et al. |
| 6,087,654 | A | | 7/2000 | Durham, III |
| 6,172,359 | B1 | | 1/2001 | Stridsberg |
| 6,191,415 | B1 | | 2/2001 | Stridsberg |
| 6,225,715 | B1 | | 5/2001 | Hoda et al. |
| 6,225,716 | B1 | | 5/2001 | Sies et al. |
| 6,528,914 | B2 | * | 3/2003 | Kloeppel et al. ............. 310/71 |
| 6,570,284 | B1 | * | 5/2003 | Agnes et al. ................. 310/89 |
| 2002/0047363 | A1 | * | 4/2002 | Kloeppel et al. ............. 310/71 |

OTHER PUBLICATIONS

Danaher Industrial Controls, Product Catalog, "Series F14 Encoder", printed from the Internet at http://www.dynaper-encoders.com/seriesf14.htm, on Sep. 10, 2003.

Danaher Industrial Controls, Product Catalog, "Series H20 Encoders", printed from the Internet at http://www.dynaper-encoders.com/seriesh20.htm, on Sep. 10, 2003.

* cited by examiner

Primary Examiner—Thanh Lam
(74) Attorney, Agent, or Firm—Brinks Hofer Gilson & Lione

(57) ABSTRACT

A motor assembly adapted to interchangeably accommodate either a resolver or an encoder. The motor assembly includes a housing having a top portion with a curved recess located therein. A rotatable shaft extends from the recess of the housing. A ring-shaped connector adjacent the shaft is adapted to fit within the recess of the housing. An encoder is connected to the ring-shaped connector and is adapted to allow the shaft to pass therethrough. Accordingly, a motor assembly is provided that may interchangeably accommodate a resolver or an encoder.

19 Claims, 4 Drawing Sheets

MOTOR FOR USE WITH A SENSOR

FIELD OF THE INVENTION

The present invention relates generally to the field of motors for use with sensors such as resolvers and encoders. More specifically, the present invention relates to the design of an encoder that is readily useful with a motor that was designed for use with a resolver.

BACKGROUND OF THE INVENTION

Many motors, e.g., brushless DC servomotors, were previously designed to include a resolver. A resolver is useful to provide position and velocity information of a rotor for the motor. This information is used by external electronics to control the velocity and position of the rotor.

Somewhat recently, the use of encoders instead of resolves has become more prevalent. While not appropriate for all applications, encoders have been found to generally have better performance than a resolver. However, the use of an encoder typically requires that the end bell of the motor be modified so as to receive the encoder Instead of the resolver. The change in the end bell is required because the physical size and mounting footprint of the encoder is generally not compatible with the design of a motor for use with a resolver. A change to the end bell of the motor is therefore required if an encoder is to be used in place of a resolver. Accordingly, manufactures are required to keep in inventory different parts in order to accommodate the use of a resolver or encoder thereby increasing the cost of manufacture. Also, the assembly of motors with different sensors requires the use of different processes which thereby increases the time required for manufacture.

Therefore, there is a need for a motor assembly that can readily accommodate either a resolver or an encoder without the use of additional parts and assembly processes.

SUMMARY OF THE INVENTION

The present invention is directed to a motor assembly that can readily accommodate either a resolver or an encoder. More specifically, the preferred embodiment of the present invention is directed to an encoder that is useful with a motor designed for use with a resolver.

According to a first aspect of the invention, a motor that can interchangeably accommodate a resolver or an encoder is provided. The motor includes a housing having a top portion with a curved recess located therein. A rotatable shaft extends from the recess of the housing. A connector adjacent the shaft is adapted to fit within the recess of the housing. An encoder is connected to the connector and is adapted to allow the shaft to pass therethrough. Accordingly, a motor is provided that may interchangeably accommodate a resolver or an encoder.

According to a second aspect of the invention, an encoder assembly for use with a motor is provided. The motor has a top surface with a curved recess located therein. A rotatable shaft extends outward from the top surface of the motor. The encoder includes a ring-shaped connector adapted to fit within the recess of the housing. An encoder body is connected to the ring-shaped connector and is adapted to allow the shaft to pass therethrough. A single fastening is adapted to secure the encoder to the motor.

According to a third aspect of the invention, a method of assembling a motor having a sensor is provided. The method includes the step of providing a motor adapted to accommodate one of a resolver and an encoder. The method also includes the step of providing the other of the resolver and the encoder adapted to be used interchangeably with the one of the resolver and the encoder. Accordingly, a motor having a single configuration is useful with either of a resolver or encoder.

The use of the term "encoder(s)" is intended to be interpreted broadly to Include different types of encoders such as optical, magnetic or capacitive.

The present invention, together with attendant objects and advantages, will be best understood with reference to the detailed description below in connection with the attached drawings.

DETAILED DESCRIPTION OF THE PREFERRED EMBODIMENTS

The present invention is directed to a motor for use with a sensor, such as an encoder. It will be understood by those of ordinary skill in the art that the encoder of the present invention is particularly useful with brushless DC servo motors. However, the present Invention is useful with motors such as AC servomotors or stepper motors as well as other motors known to those of ordinary skill in the art. It should also be recognized that while an optical encoder is described and shown herein, the present invention has application with other types of encoders, e.g. magnetic or capacitive. In addition, the present invention is useful In various applications such as industrial robots.

Figure 1:
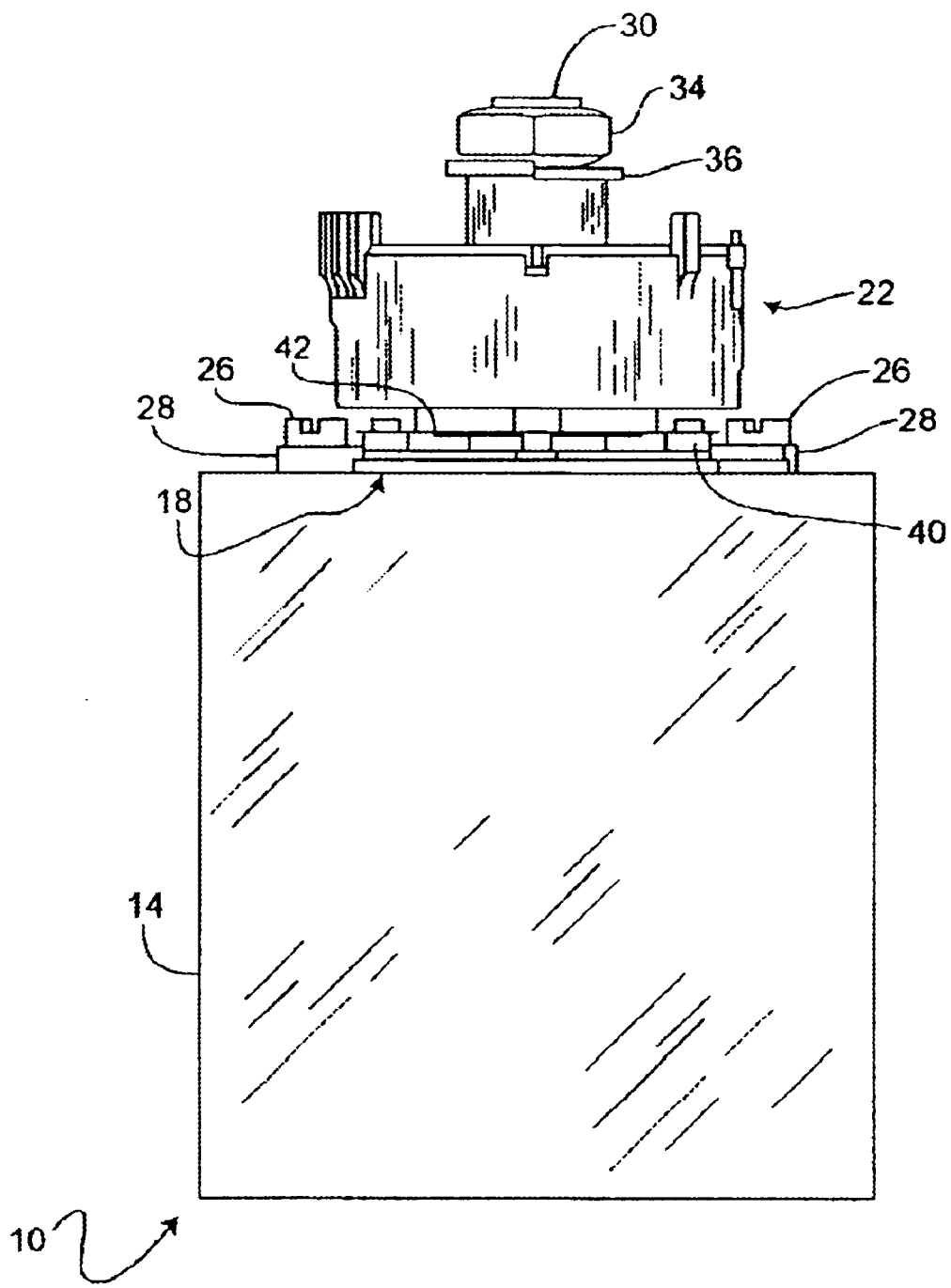
FIG. 1 is a perspective view of a motor assembly including an encoder in accordance with an embodiment of the present invention.
Figure 2:
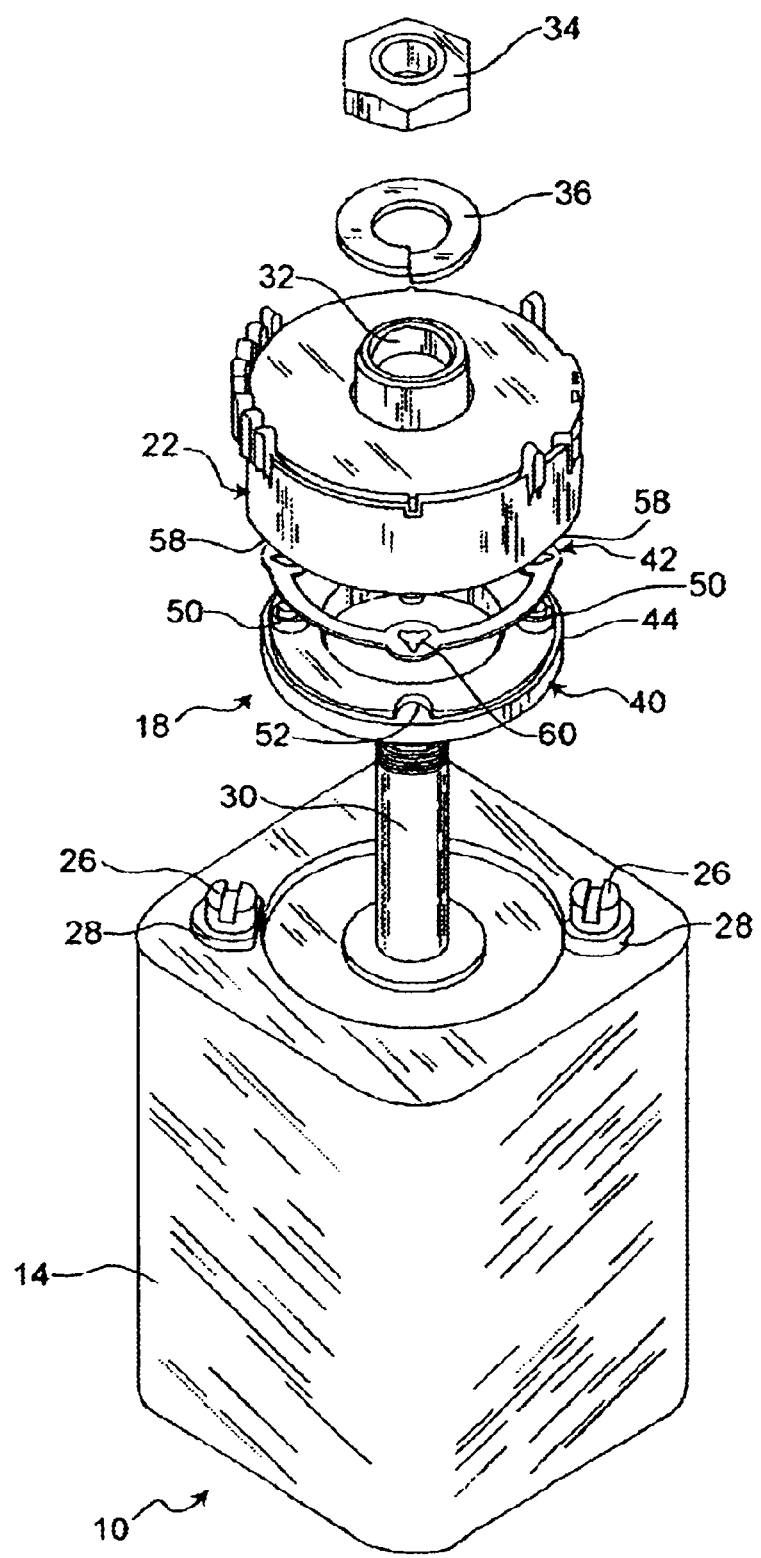
FIG. 2 is a perspective exploded view of the motor assembly as illustrated in FIG. 1.
Figure 3:
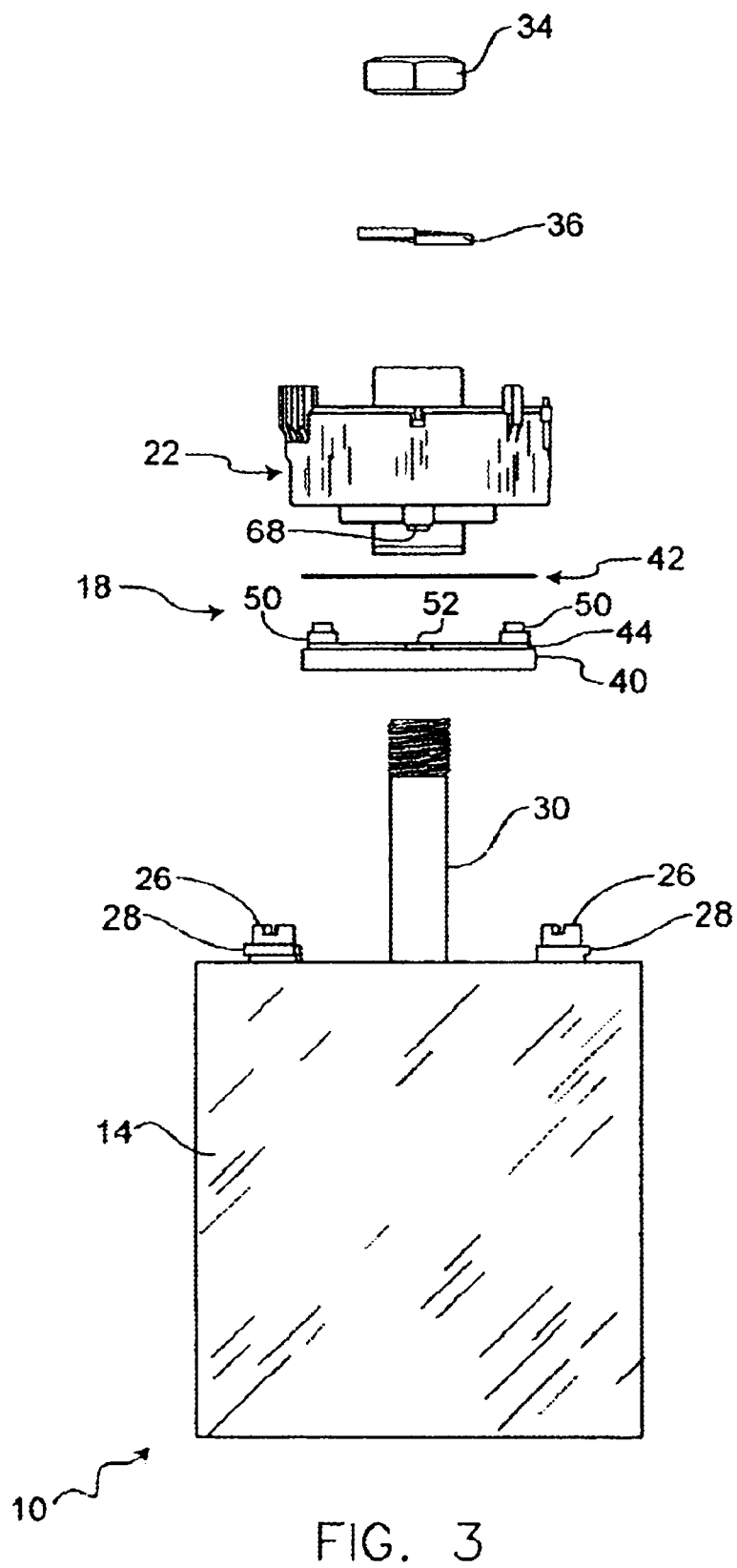
FIG. 3 is a side exploded view of the motor assembly as illustrated in FIGS. 1–2.
Figure 4:
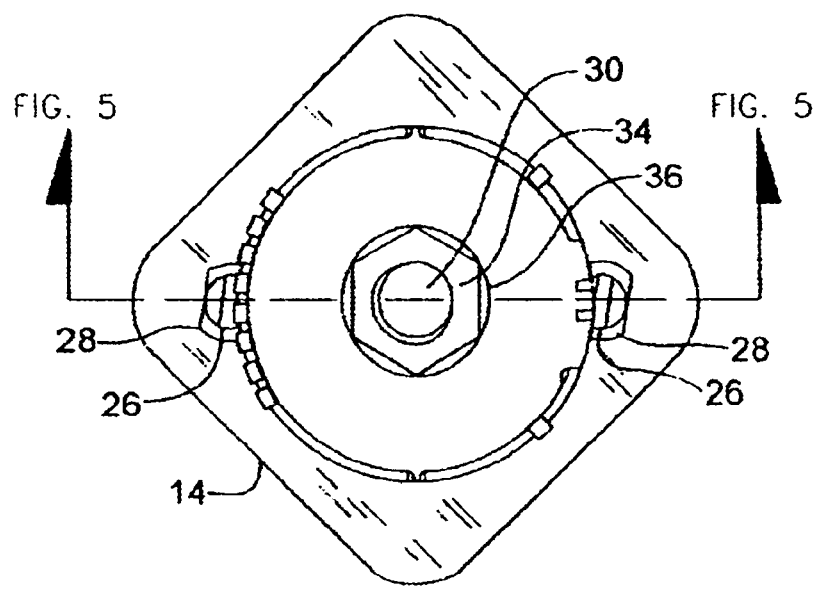
FIG. 4 is a top view of the motor assembly as illustrated in FIGS. 1–3.
Figure 5:
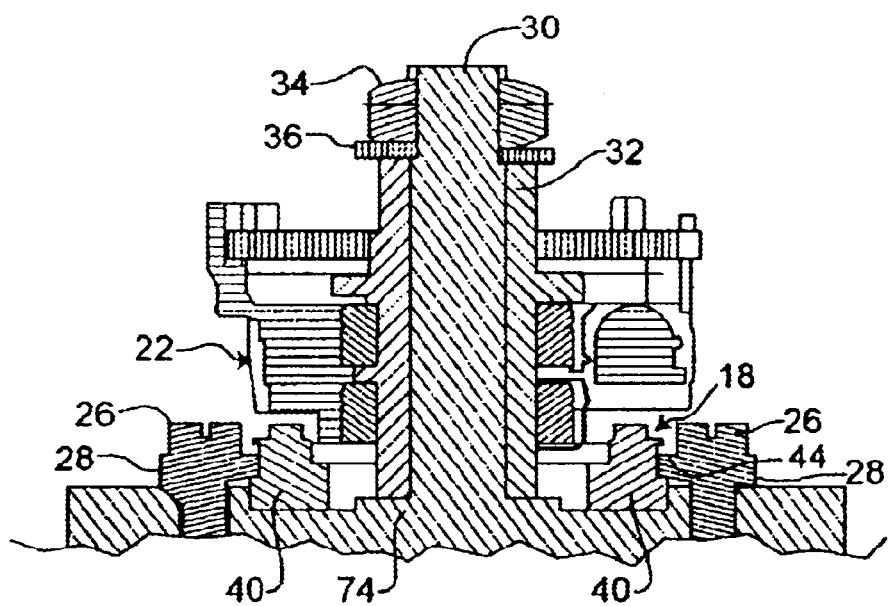
FIG. 5 is a cross-section taken along the lines 5—5 of FIG. 4.

FIG. 1 illustrates an assembled view of a motor assembly 10 in accordance with a first embodiment of the present invention. The motor assembly 10 includes, in part, a motor housing 14, a connector 18 and an encoder 22. The motor housing 14 is a conventional element such as Part No. MPM662FME-BM manufactured by MTS Automation of New Ulm, Minn. Also, the encoder 22 is a conventional optical encoder element such as Part No. F142048/61932 manufactured by Danaher Controls of Gumee, Ill. Fastener elements, including screws 26 and dips 28, are used to secure the connector 18 to the motor housing 14. As best illustrated in FIGS. 2–3 & 5, a shaft or rotor 30 extends from the motor housing 14 and passes through a channel or shaft 32 within the encoder 22. Fastener elements, such as a jam nut 34 and a washer 36 are used to secure the encoder 22 to the motor shaft 30.

With reference to FIG. 2, the connector 18 includes a servo ring 40 and a flexure or flexible connector 42. The servo ring 40 indudes a ridge 44 that extends around the periphery thereof. Screws 26 and clips 28 are used to secure the servo ring 40. As best seen in FIGS. 1 & 5, the clips 28 engage a ridge 44 In order to secure the servo ring 40 and more generally, the connector 18 to the motor housing 14. With reference to FIGS. 2–3, the servo ring 40 also includes opposing pins 50 that extend upward therefrom. Opposing cutout portions 52 are also provided on the servo ring 40. In the preferred embodiment, the servo ring 40 is formed from plastic materials or other materials such as steel or aluminum.

The flexible connector 42 includes a plurality of apertures or first openings 58 and a plurality of apertures or second openings 60. The first openings 58 are sized to engage the pins 50 of the servo ring 40. The second openings 60 are sized to engage a plurality of pins 68 (as seen in FIG. 3) that extend downwardly from the encoder 22. The pins 68 then extend into the cutout portions 52 of the servo ring 40. In the preferred embodiment, the flexible connector 42 is formed from a thin flexible steel material. However, it should be recognized that other known materials could also be implemented. The jam nut 34 and the washer 36 are then used to secure the encoder 22 to the motor shaft 30. More specifically, the jam nut 34 secures the shaft 32 against the shoulder 74 of the motor shaft 30.

Once assembled, the screws 26 and clips 48 secure the connector 18 to the motor housing 14. The encoder 22 is attached to the connector 18 through the tabs 68. The jam nut 34 and washer 36 then secure the encoder 22 against the motor shaft 30. It is an important aspect of the present invention to recognize that it allows the encoder to be fastened to the motor housing with the use of a single fastening element, e.g., the jam nut. While more than one fastening element could be used, the present invention provides for the use of a single fastening element.

The present invention also provides for a method of operation. In particular, a method of assembling a motor having a sensor is provided. A first step requires that a motor adapted to accommodate one of a resolver and an encoder be provided. A second step requires that the other of the resolver and the encoder be adapted to be used interchangeably with the one of the resolver and the encoder. Accordingly, a motor that is adapted for use with one of a resolver or an encoder is readily useful with the other of a resolver or encoder. In the illustrated embodiment, the motor housing is designed for use with a resolver and the encoder is adapted to fit the footprint of the resolver.

The embodiments described above and shown herein are illustrative and not restrictive. The scope of the invention is indicated by the claims rather than by the foregoing description and attached drawings. The invention may be embodied in other specific forms without departing from the spirit of the invention. For example, the shape and size of the motor, connector and encoder may be changed to suit the needs of a particular application. Also, while the preferred embodiment is directed to an encoder assembly that will fit the footprint of a resolver, the claims should be construed broadly to cover, in some instances, the opposite relationship. More specifically, a motor assembly designed for use with an encoder and a resolver designed to fit the footprint of an encoder. Accordingly, these and any other changes which come within the scope of the claims are intended to be embraced herein.

What is claimed is:

1. A motor assembly adapted to interchangeably accommodate either a resolver or an encoder, the motor assembly comprising:
    a) a motor housing having a top portion with a recess located therein;
    b) a rotatable shaft extending from the recess of the housing;
    c) a ring-shaped connector adjacent to the shaft and adapted to fit within the recess, the ring-shaped connector including a servo ring and a flexible connector; and
    d) an encoder connected to the connector and adapted to allow the shaft to pass therethrough whereby the motor may interchangeably accommodate a resolver or an encoder.

2. The motor assembly of claim 1 wherein the servo ring includes a ridge extending around the periphery thereof.

3. The motor assembly of claim 2 wherein the servo ring includes a pin extending upward therefrom that is adapted to engage the flexible connector.

4. The motor assembly of claim 3 wherein the flexible connector includes at least one first opening adapted to accommodate the pin of the servo ring.

5. The motor assembly of claim 4 wherein the encoder further comprises a pin extending downward therefrom and is adapted to engage the flexible connector.

6. The motor assembly of claim 5 wherein the flexible connector includes at least one second opening adapted to accommodate the pin of the encoder.

7. The motor assembly of claim 6 wherein the flexible connector is formed from a thin steel material and the servo ring is formed from a plastic material.

8. The motor assembly of claim 6 wherein the encoder is an optical encoder.

9. An encoder assembly for use with a motor having a top surface with a curved recess located therein and a rotatable shaft extending outward from the top surface, the encoder comprising:
    a) a ring-shaped connector adapted to fit within the recess; and
    b) an encoder connected to the ring-shaped connector and adapted to allow the shaft to pass therethrough and
    c) a single fastening element is adapted to secure the encoder to the motor.

10. The encoder assembly of claim 9 wherein the ring-shaped connector comprises a servo ring and a flexible connector.

11. The encoder assembly of claim 10 wherein the single fastening element is a jam nut.

12. The encoder assembly of claim 11 wherein the servo ring includes a least one cutout portion adapted to accommodate a pin extending downward from the encoder.

13. The encoder assembly of claim 12 wherein the flexible connector includes an opening that receives the pin extending downward from the encoder.

14. A motor assembly adapted to interchangeably accommodate either a resolver or an encoder, the motor assembly comprising:
    a) a motor housing having a top surface with a curved recess located therein;
    b) a rotatable shaft extending from the recess of the housing;
    c) a connector surrounding the shaft and adapted to fit within the recess;
    d) an encoder engaging the connector and adapted to allow the shaft to pass therethrough whereby the motor may interchangeably accommodate a resolver or an encoder; and
    e) a single fastening element adapted to secure the encoder to the motor housing.

15. The motor assembly of claim 14 wherein the fastening element is a jam nut.

16. The motor assembly of claim 15 wherein the connector includes a servo ring and a flexure element.

17. The motor assembly of claim 16 wherein the servo ring is formed from a plastic material and flexure element is formed from a thin steel material.

18. A method of assembling a motor having a sensor comprising:
   a) providing a motor adapted to accommodate one of a resolver and an encoder;
   b) providing the other of the resolver and the encoder adapted to be used interchangeably with the one of the resolver and the encoder whereby a motor adapted for use one of a resolver or an encoder is readily useful with the other of a resolver or encoder;
   c) providing the encoder with a connector adapted to accommodate a footprint of a resolver; and
   d) providing the connector with a servo ring and a flexible connector.

19. The method of claim 18 wherein the one of the resolver and the encoder is a resolver and the other is an encoder.

* * * * *